Figure 1:
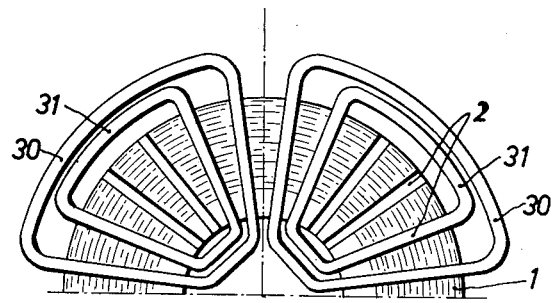

July 6, 1954  H. WEISSHEIMER  2,683,232
WINDING ASSEMBLY FOR DISK-TYPE
ELECTRIC MOTORS OR GENERATORS Filed Sept. 20, 1950  2 Sheets-Sheet 1

INVENTOR
Herbert Weissheimer.
BY
ATTORNEY

July 6, 1954

H. WEISSHEIMER 2,683,232

WINDING ASSEMBLY FOR DISK-TYPE
ELECTRIC MOTORS OR GENERATORS

Filed Sept. 20, 1950

2 Sheets-Sheet 2

Inventor:-
Herbert Weissheimer
By
C. M. Avery
Attorney

Patented July 6, 1954

2,683,232

UNITED STATES PATENT OFFICE 2,683,232

WINDING ASSEMBLY FOR DISK-TYPE ELECTRIC MOTORS OR GENERATORS

Herbert Weissheimer, Nurnberg, Germany, assignor to Siemens-Schuckertwerke, Aktiengesellschaft, Erlangen, Germany, a German corporation Application September 20, 1950, Serial No. 185,726

Claims priority, application Germany September 21, 1949

4 Claims. (Cl. 310—268)

My invention relates to disk-type electric motors and generators and, more particularly, to the magnetizable stator or rotor assembly of such dynamoelectric machines.

While the air gap between the stator and rotor of the conventional electric machines is cylindrical, the disk-type machines here referred to have an air gap of plane configuration. If the slots of the magnetizable machine structure are open toward the axial air-gap face of that structure, the appertaining coils can be wound separately and can then be inserted as a whole without deformation. In the known designs, the end turns of the individual coil units, i. e. the winding portions outside the slots, are staggered in such a manner that they dodge one another in the axial direction of the structure. The axial curvature of the coil units aggravates the manufacturing requirements and also increases the space needed for the end turns of the windings.

It is an object of my invention to simplify the design and manufacture of the windings of motors or generators of the above-mentioned type; and it is also an object to reduce the space requirements of the end turns of these windings.

According to the invention, each phase winding of a disk-type multiphase motor or generator structure is composed of coil units that are individually of a flat and plane shape. The coil units pertaining to different phase windings are disposed in respectively different axial planes of the slotted machine structure and are angularly displaced and may also be differently pitched relative to one another. According to another feature of the invention, especially relating to three-phase machines, the slot and coil arrangement is preferably such that two-thirds of the utilizable winding space of the evenly distributed slots are occupied by the coils.

Figure 2:
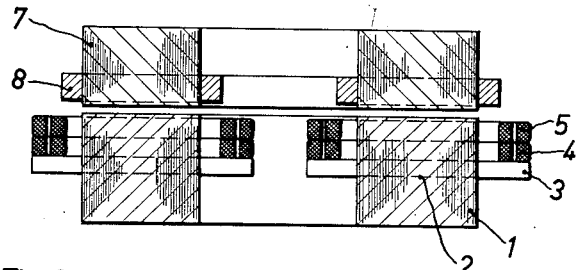
Figure 3:
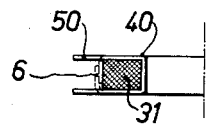
Figure 5:
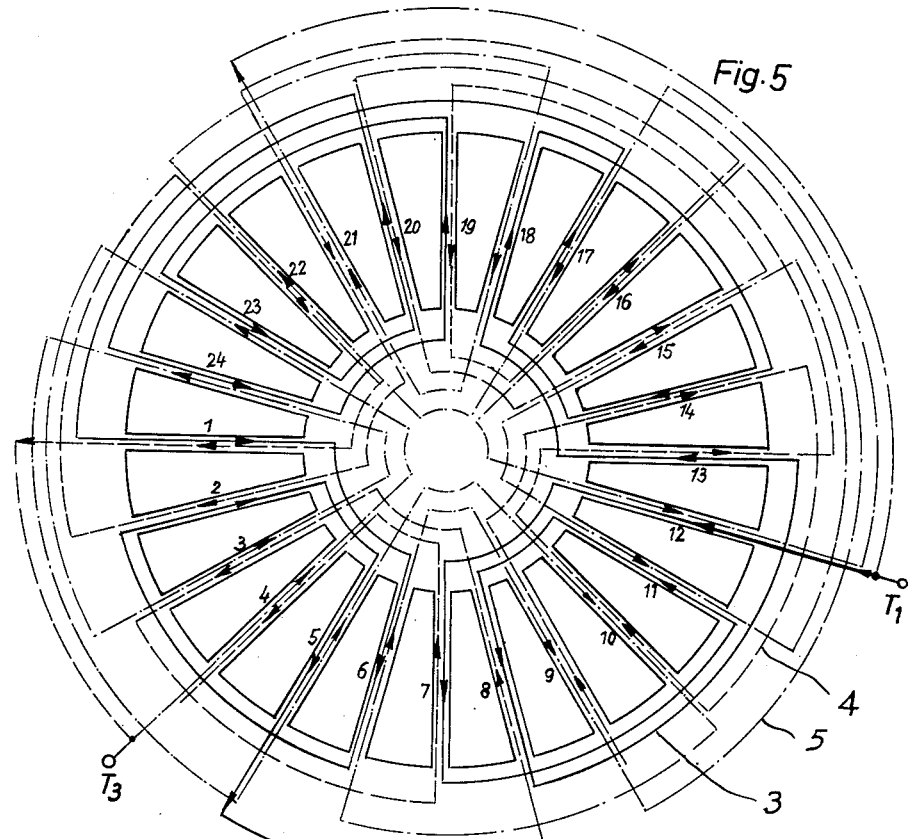
Figure 6:
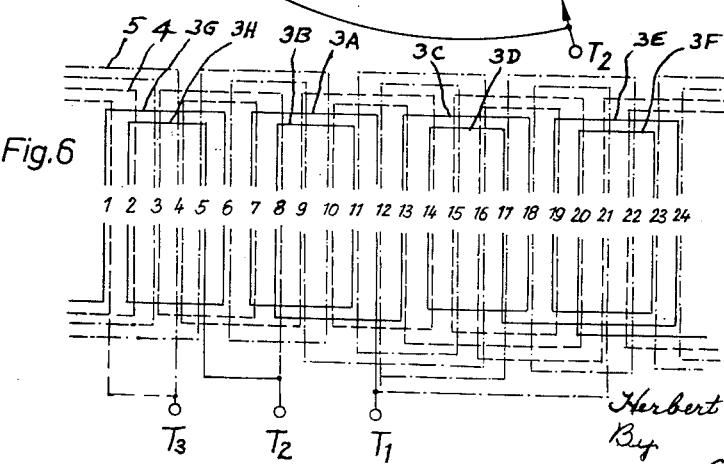
Figure 4:
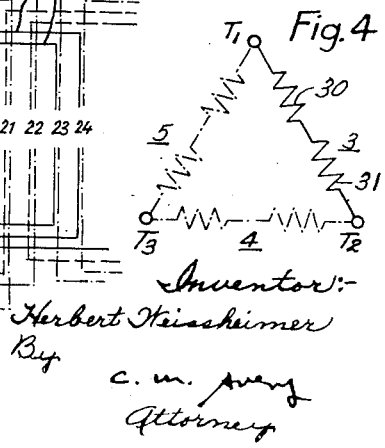

These and other features of the invention will be apparent from the following description of the embodiment exemplified by the drawing, in which:

Fig. 1 is a partial and schematical front view of a stator of a disk-type motor shown equipped with the coils for only one of its phase windings, Fig. 2 is an axial cross section through the whole motor showing only parts and details essential to the invention, Fig. 3 is a detail view, showing a cross section of one of the coil units of the same motor, Fig. 4 is a schematic diagram showing the phase windings of the improved machine delta-connected, Fig. 5 illustrates schematically a stator winding circuit for a three-phase four-pole machine made according to the invention, and Fig. 6 shows the winding circuit of Fig. 5 in developed form.

As illustrated, the annular core of the stator 1, consisting of a roll of magnetizable sheet or strip material, has a number of radially extending slots 2 which are open toward the axial front or air-gap face of the stator and are evenly spaced from one another. As apparent from Fig. 2, three layers of coil units 3, 4, 5 are inserted into the slots. Each unit is flat and plane throughout, i. e. including the end turns outside the slots. The coil units may be cemented or wedged in the slots. The rotor 7 of the motor, which forms together with the stator 1 a plane air gap at 9, may also consist of a coiled body of sheet metal and is preferably equipped with a short-circuited or cage-type winding 8.

The three coil units 3, 4, 5 appertain to three respective windings for three-phase current. In Figs. 4, 5 and 6 the phase windings 3, 4 and 5 are illustrated in full, chain, and dash-dot lines, respectively, for ease in following the stator winding circuit. These three windings and their respective coil units are of the same design but, according to the phase, are peripherally displaced from one another, as is best shown in Fig. 6. As apparent from the winding layer of a single phase shown in Fig. 1, each layer comprises wide-pitch coil units 30 and narrow-pitch units 31. Each individual unit can be machine-wound and completed separate from the stator body 1. For instance, each unit may be wound into a sleeve or casing 40 whose edge portions 50, after completion of the winding operation, are folded into the position shown at 6 to be then cemented or otherwise sealed if desired. The coil casing may also consist of a drawn foil, for instance, of triacetate, which during the drawing operation and when folding the edge (50) is sealed by a solvent such as methylene chloride.

The above-mentioned fabrication of the coil units also facilitates insulating them for high voltages. Such coil units can readily be tested during the fabricating process, i. e. before they are assembled with the core. If desired, the exterior surface of the coil units can be metallized. For high voltages, a desired distribution of potential within the insulation of the unit can be secured by the provision of embedded conductive layers. After winding the coil unit, it may be impregnated with a solidifying or hardenable rosin, resin or other plastic material, and the impregnated unit can be subjected to shaping pressure. Another applicable manufacture involves embedding each wound coil in rubber or the like substance and then vulcanizing it, thus producing an insulation especially resistant to humidity.

Fig. 4 illustrates in schematic form the phase windings 3, 4 and 5 of the machine arranged in delta connection. Connection to a three-phase line is made at terminals $T_1$, $T_2$ and $T_3$. Each individual phase winding comprises a wide pitch coil 30 and a narrow pitch coil 31 connected in series. Fig. 5 illustrates diagrammatically a complete three-phase winding-circuit plane within the slots 1 through 24 of the stator of a four-pole machine. A developed form of Fig. 5 is shown in Fig. 6. In Fig. 6 the winding 3 for one of the three phases is shown subdivided into four pairs of individual winding units 3A and 3B, 3C and 3D, 3E and 3F, and 3G and 3H, each pair comprising a series-connected wide pitch coil 30 and narrow pitch coil 31. These pairs are in turn series-connected with one another to provide a continuous and progressive circuit, as illustrated in Figs. 5 and 6. The units of the second and third phase windings are placed and connected to provide corresponding winding paths, the only difference being that each of the phase windings is displaced eight poles circumferentially from the other two, as can be most clearly seen in Fig. 6.

In the illustrated three-phase stator assembly, only two-thirds of the available total winding space of the slots is utilized. This is acceptable because, in disk-type machines, the slots can readily be given any desired depth without increasing the amount of core material.

By stacking several sets of coil units of different pitch dimensions above one another and operating them selectively, it is also possible to make machines according to the invention readily applicable for control by pole switching.

It will be apparent to those skilled in the art upon a study of this disclosure that my invention permits of various modifications other than those specifically described, without departing from the essence of the invention and within the scope of the claims annexed hereto.

I claim:
1. A multiphase dynamoelectric machine, comprising an annular stator structure and an annular rotor structure coaxially disposed and having respective axial faces of geometrically plane and annular shape facing each other and forming together a flat air gap, said stator structure having radial slots of even angular spacing open toward said gap and all having respectively parallel sides of uniform width, all slots being equal to each other, phase windings for the respective phases of the machine each having coil units traversing said slots, each of said coil units having a plane shape throughout and each of said windings occupying a single plane parallel to said faces, said phase windings being stacked upon one another in respectively different planes and being angularly displaced relative to one another, a plurality of coil units of respectively different phase windings being located axially one above the other in each slot.

2. A three-phase dynamoelectric machine, comprising an annular magnetizable stator structure having a geometrically plane and axial air-gap face and having radial slots of even angular spacing open toward said face and all having respectively parallel sides of uniform width, all slots being equal to one another, three phase windings each having a plurality of peripherally sequential coil units traversing said slots, each of said coil units having a plane shape throughout and each of said windings extending in a single plane parallel to said air-gap face and occupying two-thirds of the total slot space available in said plane, said three windings being stacked flat upon one another in three respective planes and being angularly displaced relative to one another, a plurality of coil units of respectively different phase windings being located axially one above the other in each slot.

3. A multiphase induction motor, comprising respective annular stator and rotor structures coaxially disposed and having respective geometrically plane axial air-gap faces opposite each other, one of said structures having a cage winding, said other structure having radial slots of even angular spacing open toward the pertaining air-gap face and all having respectively parallel sides of uniform width, all slots being equal to one another, a plurality of phase windings for the respective phases of the machine each having coil units traversing said slots, each of said coil units having a plane shape throughout and each of said windings occupying a single plane parallel to said faces, said windings being stacked upon one another in respectively different planes and being angularly displaced relative to one another, a plurality of coil units of respectively different phase windings being located axially one above the other in each slot.

4. A multiphase dynamoelectric machine, comprising an annular magnetizable structure having a geometrically plane and axial air-gap face and having radial slots of even angular spacing open toward said face and all having respectively parallel sides of uniform width, all slots being equal to one another, a plurality of sets of phase windings, each set having a number of phase windings equal to that of the machine phases, all of said phase windings being axially stacked and occupying respectively different planes all parallel to said face, each phase winding having peripherally sequential coil units of plane shape traversing said slots, said windings of each set being angularly displaced relative to each other and said different sets having a respectively different winding pitch corresponding to different pole numbers respectively, a plurality of coil units of respectively different phase windings being located axially one above the other in each slot.

References Cited in the file of this patent

UNITED STATES PATENTS

| Number | Name | Date |
|---|---|---|
| 229,191 | Seeley | June 22, 1880 |
| 570,914 | Dorman | Nov. 10, 1896 |
| 672,712 | Rosenfeld et al. | Apr. 23, 1901 |
| 744,145 | Wiard | Nov. 17, 1903 |
| 1,605,796 | Tanzler | Nov. 2, 1926 |
| 1,737,128 | Ross | Nov. 26, 1929 |
| 1,894,724 | Apple | Jan. 17, 1933 |
| 1,986,616 | Baldwin | Jan. 1, 1935 |
| 2,155,514 | Tolson, et al. | Apr. 25, 1939 |
| 2,573,283 | Seitz | Oct. 30, 1951 |

FOREIGN PATENTS

| Number | Country | Date |
|---|---|---|
| 484,550 | Great Britain | May 6, 1938 |
| 691,525 | France | July 15, 1930 |